United States Patent [19]

Mutschlechner

[11] 4,127,290
[45] Nov. 28, 1978

[54] SPIGOT-AND-SOCKET JOINT FOR TUBES

[75] Inventor: Hermann Mutschlechner, Hall in Tirol, Austria

[73] Assignee: Tiroler Rohren- und Metallwerke Aktiengesellschaft Hall in Tirol (Austria), Hall in Tirol, Austria

[21] Appl. No.: 791,427

[22] Filed: Apr. 27, 1977

[51] Int. Cl.² ................................................ F16L 21/06
[52] U.S. Cl. ......................................... 285/343; 285/374; 285/421
[58] Field of Search ............... 285/343, 337, 421, 15, 285/104, 105, 113, 374

[56] References Cited

U.S. PATENT DOCUMENTS

| 2,479,058 | 8/1949 | Botting | 285/104 X |
| 2,755,109 | 7/1956 | Risley | 285/343 X |
| 2,973,977 | 3/1961 | Stovall | 285/337 |
| 3,594,023 | 7/1971 | Yano | 285/337 |
| 3,698,744 | 10/1972 | Bevington | 285/376 X |
| 3,899,183 | 8/1975 | Wild et al. | 285/231 X |

Primary Examiner—Thomas F. Callaghan
Attorney, Agent, or Firm—Cushman, Darby & Cushman

[57] ABSTRACT

A spigot and socket joint includes an annular locking member surrounding the spigot member, an annular part surrounding the locking member and a clamping collar engaging radial flanges on the annular part and on the socket member to hold the annular part against the locking member. The locking member can be releasably clamped to the spigot member or a stop can be secured to the circumference of the spigot member to limit axial movement of the locking member toward the socket member.

9 Claims, 8 Drawing Figures

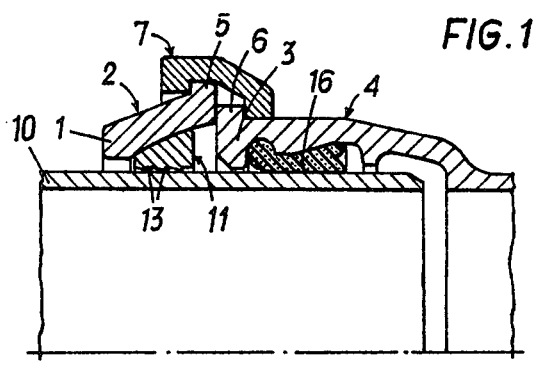
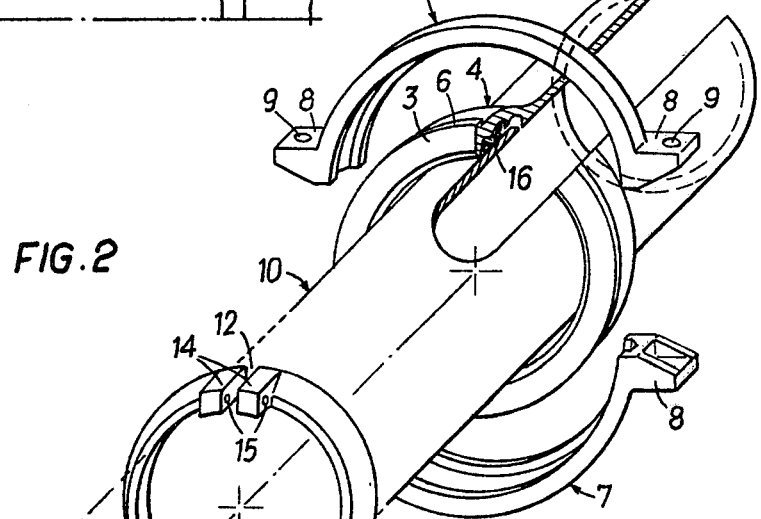
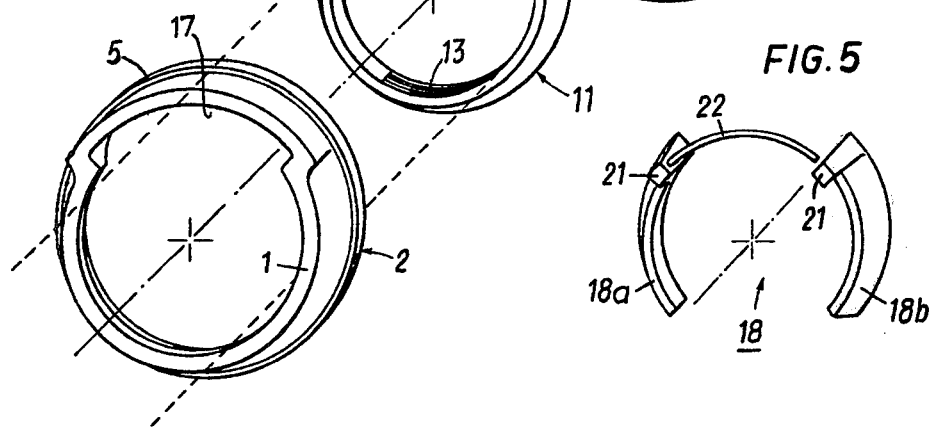
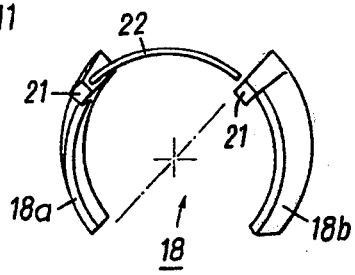
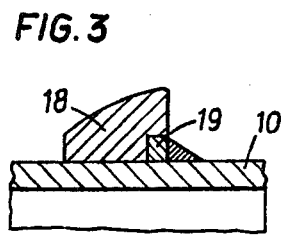
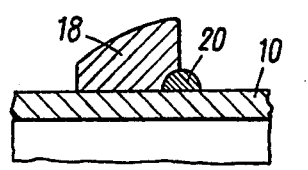

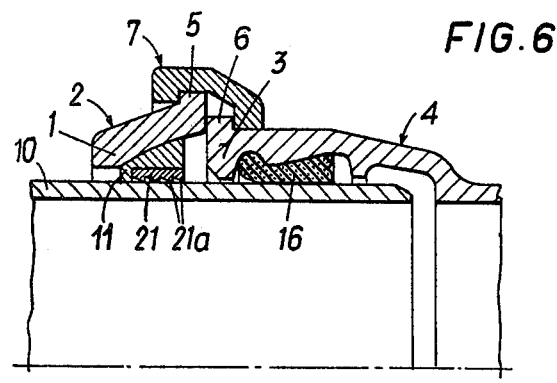
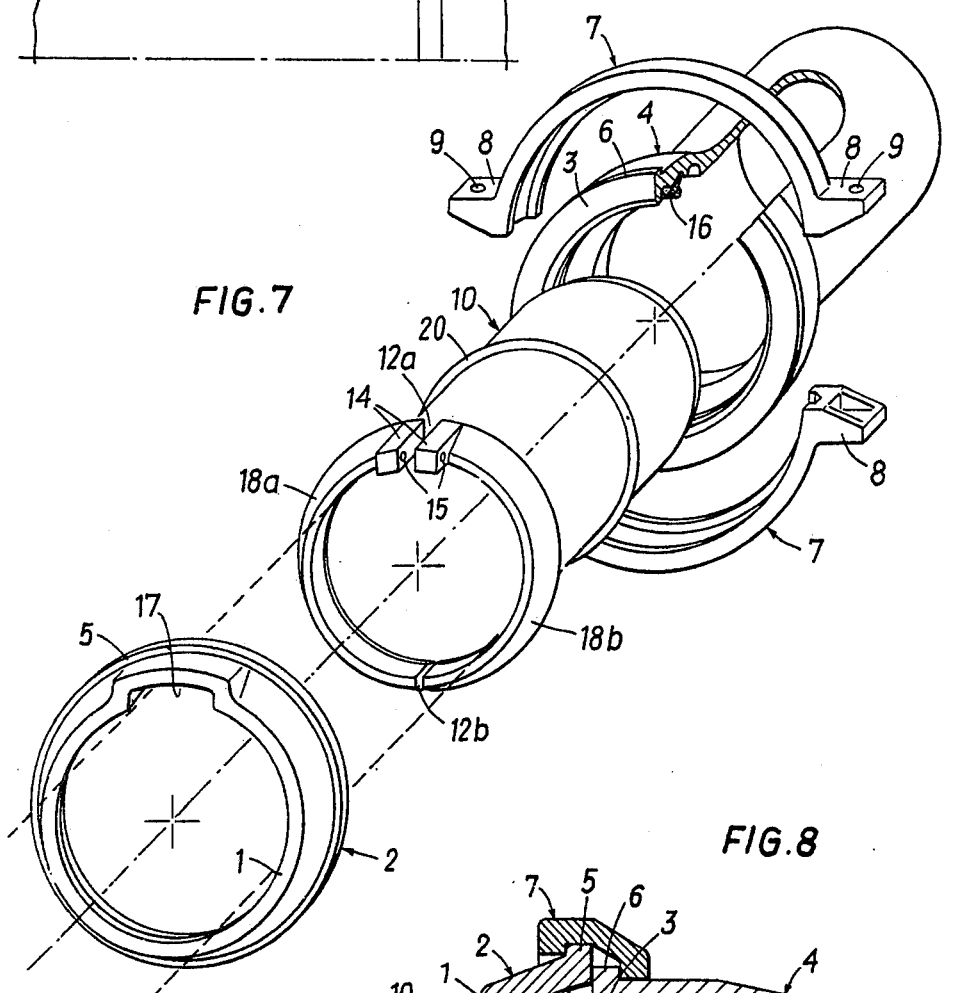
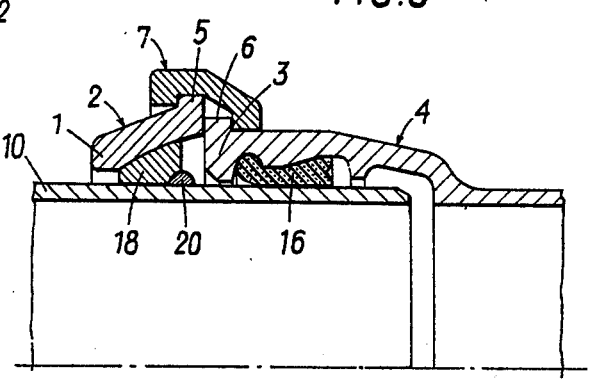

SPIGOT-AND-SOCKET JOINT FOR TUBES

In spigot-and-socket joints for tubes, the spigot end of one tube is being introduced into the socket end of another tube and a tight seal is provided by a sealing ring arranged within the socket. In most cases, this sealing ring is not sufficient for preventing the spigot-and-socket joint from becoming loosened. It is known to arrange locking members at the socket and at the spigot end of the tube to provide a slide protection for preventing the tubes from becoming pulled apart.

The invention refers to a spigot-and-socket joint for tubes, pipe fittings or the like, which are preferably produced by a centrifugal casting process, in which the spigot end of one of the tubes to be mutually connected is adapted for being introduced, conveniently with interposition of a sealing ring, into the socket end of the other tube, noting that an annular part is provided at the socket end and is removably connected with this socket end, said annular part having an inwardly extending rim embracing an annular locking member being adapted for being secured to the spigot end of the tube and extending at least over part of the circumference of the spigot end of the tube. In known types of spigot-and-socket joints of the kind described, said annular part provided at the socket end is an integral portion of the socket and this requires a special construction of the socket. Particularly with shaped tubes such as pipe elbows and curved pipes as well as connecting pieces, a slide protection is frequently not required so that such shaped tubes are provided with short sockets. To provide a slide protection also in these cases, it was therefore necessary to provide sockets of various shapes for said known constructions. In view of the fact that pipe elbows of different radii of curvature and also pipe fittings of various shapes are required, storing of spare parts and also production of the different types of sockets becomes quite expensive. Furthermore, sockets of large axial extension cannot be used in view of the limited space available in those frequently occurring applications which do not require a slide protection.

The present invention now aims at avoiding the mentioned drawback and essentially consists in that the annular part as well as the end of the socket is provided at its outer circumference with an outwardly extending flange, said flanges being embraced by a subdivided clamping collar of a U-shaped cross-section, noting that the inwardly extending rim is provided in a manner known per se with a recess extending over part of its inner circumference and that axial protrusions of the locking member extend into said recess. By removably connecting the annular part provided at the end of the socket, the same sockets can be used for both, a connection secure from sliding and a connection not secure from sliding, noting that it becomes possible to reduce by one half the number of shaped pipes to be stored and to make more economic the production of bigger series. In view of the annular part provided at the socket end and in view of the end of the socket being provided with an outwardly extending flange at the respective outer circumference and said flanges being embraced by a bipartite clamping collar of U-shaped cross-section, the annular part provided at the socket end can be reliably connected with the socket end in such a manner that the connection will resist substantial tension forces. In view of the inwardly extending rim being provided over part of its inner circumference with a recess accommodating axial protrusions of the locking member, the locking member embraced by the annular part can, when assembling the spigot-and-socket joint, be gripped from the outer side and be adjusted in its position relative to the annular part.

According to a preferred embodiment of the spigot-and-socket joint according to the invention, the annular locking member to be secured at the spigot end has the shape of a clamping ring adapted to be tightened which is provided at its ends to be tightened with axially extending protrusions extending into the recess of the inwardly extending rim and being adapted to be engaged by one or more clamping elements. This provides the possibility to exactly arrange the locking member at the spigot end of the tube by means of the clamping elements and that, after assembling the spigot-and-socket joint, the clamping elements located within the recess of the annular part cannot disturb the operational behaviour of the spigot-and-socket joint. The spigot end of the tube can be prevented from becoming excessively pulled apart from the joint if, according to the invention, the locking member is provided with an indentation at its side facing the spigot end of the tube, because in this case, when subjecting the spigot-and-socket joint to tension forces, the locking member is still further compressed by the annular part embracing the locking member and the teeth of the indentation of the locking member are pressed into the surface of the spigot end of the tube. A clamping ring serving as the locking member is, according to the invention, conveniently provided with an annular insert of a harder material, said annular insert being provided at its inner surface with annular protrusions being shaped like saw teeth. This provides the possibility to produce the clamping ring of a tough material, for example as a forging, and to exert on the annular insert the force required for pressing the teeth into the spigot end of the tube by the annular part and the clamping ring, without risk of destroying the clamping ring.

According to the invention, the annular locking member to be secured at the spigot end of the tube can be composed of two component parts, noting that each of these component parts is provided on one of its ends with axially extending protrusions which can be mutually connected by means of a screw and which extend into the recess of the inwardly extending rim and noting that said component parts of the locking member are, in a manner known per se, supported on the spigot end of the tube. Such an embodiment is particularly suitable if the locking member is, when assembling the spigot-and-socket joint, to be abutted against a supporting ledge or weld bead. In this case it is also possible to use a bipartite annular locking member to be secured to the spigot end of the tube and having one end each of the component parts provided with axially extending protrusions extending into the recess of the inwardly extending rim, noting that a rod to be arranged between said protrusions is provided to secure in position the protrusions within the recess.

In known types of spigot-and-socket joints, in which the annular part provided at the end of the socket forms an integral part of the socket, the arrangement was such, that the spigot end of the tube was provided at its outer surface with supporting ledges and that the inner diameter of the inwardly extending rim of the annular part of the socket was greater than the maximal diameter of the outer surfaces of the supporting ledge. After shifting the socket of one tube over the spigot end of the other tube, the locking members were introduced for engaging the supporting ledge as well as the inwardly extending rim of the annular part provided at the socket end and for thus providing the desired slide protection. In this known embodiment, the supporting ledges had to be welded to the spigot end of the tube or had the shape of a weld bead. The same type of construction of the spigot end of a tube is now also possible with a spigot-and-socket joint according to the invention so that sockets of a joint according to the invention and sockets of known joints, in which the inwardly extending rim of the annular part forms an integral part of the socket, can, if desired, be used in the same pipe line.

The invention provides still an other advantage. When installing pipe lines, it becomes frequently necessary to use tubes of smaller length and to shorten exisiting tubes at the site, thus removing the spigot end with the supporting ledges. In this case, welding of new supporting ledges and, respectively, applying a weld bead forming the supporting ledge is quite difficult. Even when having at disposal a welding apparatus it is necessary to have at the site skilled welding personnel for doing the required work. Tubes having been shortened at the site must therefore be brought into the workshop and provided there with the supporting ledge and, respectively, the weld bead, which is quite laboursome, time-consuming and expensive. By removably connecting the annular part provided at the end of the socket with the end of the socket, the locking member used can be a clamping ring adapted to be tightened, which is, after placing in position the annular part provided at the end of the socket, tightened on the spigot end, whereupon the annular part is connected with the socket end. Clamping of the clamping ring on the spigot end of the tube does not provide any difficulties whatsoever and can be effected by unskilled personnel and avoids the necessity of any welding operation at the site. The clamping ring is, at its ends to be mutually clamped, provided with axially extending protrusions to be acted upon by one or more clamping elements such as a clamping element simply formed of a screw protruding through holes provided in the protrusions and thus avoiding any undue enlargement of the outer circumference of the clamping ring at the clamping area. In known embodiments in which the annular part comprising the inwardly extending rim is integral with the socket and is provided with a recess, this recess can be used for inserting the bipartite locking member adapted for being supported against a supporting ledge welded to the spigot end of the tube or a weld bead provided at this spigot end. However, in view of providing, according to the invention, the recess on the inwardly extending rim of a separate annular part, which is connected with the socket only after clamping the clamping ring, the axially extending protrusions of the clamping ring can be mutually clamped first and the clamping ring can also be clamped to the spigot end of the tube first, whereupon the annular part is being shifted in direction to the socket in such a relative position that the axially extending protrusion will be accommodated within the recess. Thus, the invention provides the possibility to use a clamping ring together with a smooth spigot end of the tube or to use a bipartite locking member together with a spigot end of the tube being provided with a supporting ledge or a weld bead and to insert such a bipartite locking member.

The invention is further illustrated with reference to the drawing showing various embodiments of a spigot-and-socket joint according to the invention.

FIG. 1 shows an axial section through the socket and the spigot end of a tube introduced therein.

FIG. 2 represents in a perspective view the various component parts in an exploded view.

FIGS. 3 and 4 show alternate embodiments of the spigot end with the locking member placed in position.

FIG. 5 shows a bipartite locking member in a perspective view.

FIG. 6 shows another embodiment corresponding to FIG. 1.

FIG. 7 illustrates the use of a bipartite clamping ring together with a tube provided with a weld bead on its spigot end and FIG. 8 shows an axial section through a spigot-and-socket joint composed of the component parts shown in FIG. 7.

As is illustrated by FIGS. 1 and 2, the annular part 2 comprising the inwardly extending rim 1 is removably connected with the end 3 of the socket 4. This annular part 2 has on its outer circumference an outwardly extending flange 5. The end 3 of the socket 4 has also an outwardly extending flange 6. These two flanges 5 and 6 are embraced by a clamping collar 7 of U-shaped cross-section. Both parts of the clamping collar 7 are provided at their ends with outwardly extending flaps 8 being provided with holes 9 for accommodating clamping screws. By clamping together both parts of the clamping collar 7, the annular part 2 is firmly clamped to the end 3 of the socket 4. A clamping ring 11 being slotted by a slot 12 is clamped to the spigot end 10 of the tube. This clamping ring 11 has at its inner surface annular protrusions 13 of saw tooth shape. Said annular protrusions serve the purpose of improving the seat of the clamping ring on the spigot-end. At the area of the slot 12, axially extending protrusions 14 are provided at the ends of the clamping ring, said protrusions being provided with holes 15 into which a clamping screw is to be inserted. A sealing ring 16 is accommodated within the socket 4. When assembling the spigot-and-socket joint, the annular part 2 is being put into position first, whereupon the clamping ring 11 is being clamped in position and subsequently the annular part 2 is clamped to the socket 4 or its end 3, respectively, by means of a bipartite clamping collar 7.

The inwardly extending rim 1 of the annular part 2 has a recess 17 providing the space required for accommodating the axial extending protrusions 14 of the clamping ring 11.

In the embodiment shown in the FIGS. 1 and 2, the locking member is formed of the clamping ring 11. FIG. 3 shows an embodiment in which the locking member 18 is abutted against a supporting ledge 19 welded to the spigot end 10. FIG. 4 shows an embodiment in which a weld bead 20 applied to the outer surface of the spigot end 10 of the tube forms the abutment for the locking member 18.

Such a locking member 18 is shown in FIG. 5. This locking member consists of two segments 18a and 18b. Both segments are provided with axially extending protrusions 21. A rod 22 is welded to the protrusion 21 of the segment 18a. The supporting ledge 19 and the weld bead 20, respectively, have a smaller outer diameter than is the inner diameter of the rim 1 of the annular part 2. This annular part 2 can thus be shifted over the supporting ledges 19 and the weld bead 20, respectively, noting that this annular part can already be connected to the socket 4 by means of the bipartite clamping collar 7. After having shifted the annular part over the supporting ledge 19 or the weld bead 20, respectively, the segment 18b of the locking member 18 is being inserted into the recess 17 and shifted in clockwise direction and thus in right hand direction behind the rim 1. Subsequently, the segment 18a is inserted into the recess 17, noting that the rod 22 assumes an outwardly bent position. This segment 18a is then being shifted in counterclockwise direction and thus in left hand direction behind the rim 1 until the protrusion 21 contacts the left hand side of the recess 17. In this position, the rod 22 is being bent into the plane of the locking member 18. With the end of the rod 22 contacting the protrusion 21 of the segment 18b, both segments 18a and 18b are held in the relative position as illustrated in FIG. 5.

A further possible embodiment of a bipartite locking member is illustrated in FIG. 7, showing the various component parts of an inventive spigot-and-socket joint in an exploded view and having incorporated the same reference numerals as used before. Both parts 18a and 18b of the bipartite clamping ring are secured to the spigot end of the tube by means of a screw introduced into the holes 15 provided in the axial extending protrusions 14, noting that, in view of a further slot 12b being provided opposite to the slot 12a located between the axial extending protrusions 14, the clamping ring can by means of the clamping screw be sufficiently pressed on the surface of the spigot end 10 of the tube. The assembled spigot-and-socket joint is shown in an axial section in FIG. 8 which has equally incorporated the reference numerals used before.

FIG. 6 illustrates an embodiment of a spigot-and-socket joint in which an insert 21 consisting of a harder material than is the material of the clamping ring is provided at the inner side of the clamping ring, noting that teeth 21a were provided at the inner side of this insert 21, so that when subjecting the spigot-and-socket joint to tension forces these teeth 21a are pressed into the spigot end 10 of the tube. The reference numerals contained in FIG. 6 are the same as in FIG. 1.

What I claim is:

1. In a spigot and socket joint in which an end of a spigot member fits into an end of a socket member: an annular locking means removably surrounding at least a part of the circumference of said spigot member and having an outer surface facing away from said socket member; stop means secured to the circumference of said spigot member and abutting said locking means to limit axial movement of said locking means toward said socket member, said annular locking means being radially expansible and contractible so that it can be placed in engagement with said spigot member after said stop means has been secured to said spigot member; an annular part surrounding said spigot member and being axially movable relative thereto, the inner diameter of said annular part being greater than the diameter of said stop means so that said annular part can slide axially past said stop means, said annular part having a rim surrounding and engaging said outer surface of said locking means, said annular part and said socket member each having a radially outwardly extending flange; and a removable clamping collar constructed of U-shaped pieces engaging said flanges and releasably holding the same in fixed axial relationship with respect to each other.

2. A joint as in claim 1 wherein said locking means is a locking ring having two ends each having a protrusion thereon; and connecting means cooperating with said protrusions for drawing said protrusions together so as to clamp said locking ring to said spigot member, said annular part having a recess into which said protrusions extend.

3. A joint as in claim 1 wherein said locking means is formed of at least two segmental parts each having an axial protrusion thereon, said annular part having a recess into which said protrusions extends.

4. A joint as in claim 3 including connecting means cooperating with said protrusions for drawing said protrusions together so as to clamp said segmental parts to said spigot member, said annular part having a recess into which said protrusions extend.

5. A joint as in claim 4 wherein said locking member consists of two segmental parts and includes a rod inserted between and in engagement with said segmental parts to hold each of said protrusions in engagement with a wall of the recess in said annular part.

6. In a spigot and socket joint in which an end of a spigot member fits into an end of a socket member: a clamping ring surrounding at least a part of the circumference of said spigot member, said clamping ring having an outer surface facing away from said socket member and said clamping ring having two ends each having an axial protrusion thereon; means releasably engaging said protrusions for drawing them toward each other so as to clamp said clamping ring to said spigot member; an annular part surrounding said spigot member and being axially movable relative thereto, said annular part having a rim surrounding and engaging said outer surface of said clamping ring, said rim having a recess into which the protrusions on said clamping ring extend, said annular part and said socket member each having a radially outwardly extending flange; and a removable clamping collar constructed of U-shaped pieces engaging said flanges and releasably holding the same in fixed axial relationship with respect to each other.

7. A joint as in claim 6 wherein said clamping ring has teeth on its inner circumference, said teeth being in contact with said spigot member.

8. A joint as in claim 6 wherein said clamping ring includes along its inner circumference an annular insert of harder metal having annular protrusions of saw-toothed profile.

9. A joint as in claim 6 wherein said clamping ring is constructed of hard metal.

* * * * *